United States Patent [19]

Komplin

[11] Patent Number: 4,790,672

[45] Date of Patent: Dec. 13, 1988

[54] PRESSED SLEEVE BEARING

[75] Inventor: Steven R. Komplin, Lexington, Ky.

[73] Assignee: International Business Machines Corporation, Armonk, N.Y.

[21] Appl. No.: 944,683

[22] Filed: Dec. 19, 1986

[51] Int. Cl.⁴ .............................................. F16C 27/02
[52] U.S. Cl. .................................. 384/125; 384/222; 384/296
[58] Field of Search ............... 384/125, 222, 220, 221, 384/97, 296

[56] References Cited

U.S. PATENT DOCUMENTS

| | | |
|---|---|---|
| 4,090,746 | 5/1978 | Harkins et al. ...................... 384/125 |
| 4,235,482 | 11/1980 | Gibson ................................. 384/125 |
| 4,671,678 | 6/1987 | Münch ................................. 384/222 |

Primary Examiner—Lenard A. Footland
Attorney, Agent, or Firm—Laurence R. Letson

[57] ABSTRACT

A pressed sleeve bearing is disclosed which is moldable out of plastic and which will provide a superior retaining characteristic, while at the same time will retain the designed interior diameter of the bearing, unaffected from the pressing forces and deformation. The region of engagement between the bearing and the supporting part is displaced axially from the bearing region so that any deformation of the sleeve will not be communicated to the bearing surface. The interior of the sleeve in the region of engagement is relieved to provide clearance for the shaft that will be inserted into the bearing.

5 Claims, 1 Drawing Sheet

PRESSED SLEEVE BEARING

This invention relates to a bearing and more specifically to sleeve bearings that may be pressed into the bore of a supporting part or member.

BACKGROUND OF THE INVENTION

Press fit sleeve bearings of both plastic and metal are well known. Metal sleeve bearings are typically pressed into a bore and then machined to the final internal dimension to accommodate the shaft that is intended to operate within the bearing. The post insertion machining is expensive and disrupts the normal flow of assembly of the product.

The plastic sleeve bearings have a diffenent drawback. In order for the sleeve to remain in the bore, there must be sufficient deformation in the bearing material to create the forces needed to retain the bearing in the bore. In plastics of the type used for bearings, the required deformation may be quite significant and therefore result in the deformation of the interior dimension. Since it is very diffficult to accurately predict the amount of internal deformation, due to variations in the tolerances of the bore hole and the exterior sleeve dimensions, it is preferable to form the bearing such that the bearing structure permits of controlled deformation. This then minimizes the requirement to perform post assembly operation on the bearing material. It is not very practical to perform a post insertion machining operation on the plastic bearing, since machining of plastic may not be precise and is is difficult to secure smooth bearing surfaces on plastic by machining. The molded skin of a plastic piece provides a superior bearing surface than that of a machined surface.

Prior attempts to overcome the problem of using plastic materials as bearing sleeves have followed the approach of accommodating the compression of the bearing exterior without unduly effecting the interior bearing surface.

U.S. Pat. No. 3,359,685 to L. M. Hodgen discloses a bearing sleeve which provides the bearing surface in a series of alternating lands with intermediate grooves, parallel to the axis of the bearing. The lands provide the bearing surface, while the grooves provide flexural relief to accommodate the compression of the material. The exterior of the sleeve is likewise a series of alternating lands and grooves. The lands of the exterior surface are radially aligned to the grooves of the interior surface, thereby permitting the distortion to be accommodated in the region of the groove of the interior surface with a minimum distortion of the bearing surface.

U.S. Pat. Nos. 1,555,214 to C. W. Johnson and 3,515,417 to J. H. Bowman both use serrations or splines on the exterior surface of the bearing to accept the deformation caused by the insertion of the bearing into the bore of another member. In both of the patents, the splines or serrations extend the full length of the bearing.

In the case of the Johnson patent, the bearing is lined with a split sleeve which defines the interior dimension of the bearing. This sleeve may contract or expand. Dimensional stability is thereby sacrificed in the Johnson bearing.

The Bowman bearing appears more dimensionally stable on the interior but uses the flexure of the splines to effect a centering of the bearing surface.

For precision applications involving relatively light loads, plastic bearings are desirable since they may be molded to very tight tolerances. Cost is very reasonable, particularly if the molded dimensions may be used without further operations in the finally assembled product.

SUMMARY OF THE INVENTION

A bearing in the form of a sleeve but having three distinct regions provides solutions to the deformation of the bearing surface as described above. The sleeve is molded to the desired interior dimension and with an exterior dimension of less than the interior dimension of the bore. On the open ends of the bearing just described, the positioning regions are formed. The interior diameter of the positioning regions, which extend axially from the ends of the bearing region, is dimensioned to be larger than the diameter of the bearing surface and the exterior surface of the positioning regions is typically slightly larger in diameter than that of the bore into which it will be fitted.

To provide the deflection of the plastic material which will result in the forces necessary to retain the bearing in position, the ends of the positioning regions may be formed into exterior flanges, continuous or interrupted. The segments of the interrupted flanges are dimensioned to cause the cylindrical portion of the cylinder forming the positioning region to deflect when the bearing is positioned in the bore. The resistance to deflection creates the force that engages the interrupted flange with the interior of the bore.

The advantages of the invention and the attributes of the invention which overcome the disadvantages of the prior art will become more apparent from the Drawings and the Detailed Description of the Invention.

DRAWINGS

DETAILED DESCRIPTION OF THE INVENTION

Figure 1:
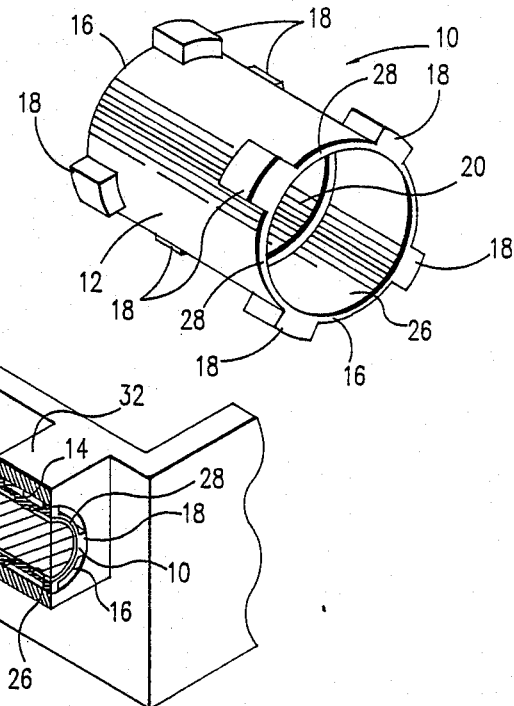
FIG. 1 is an oblique view of the bearing, in accordance with this invention.
Figure 2:
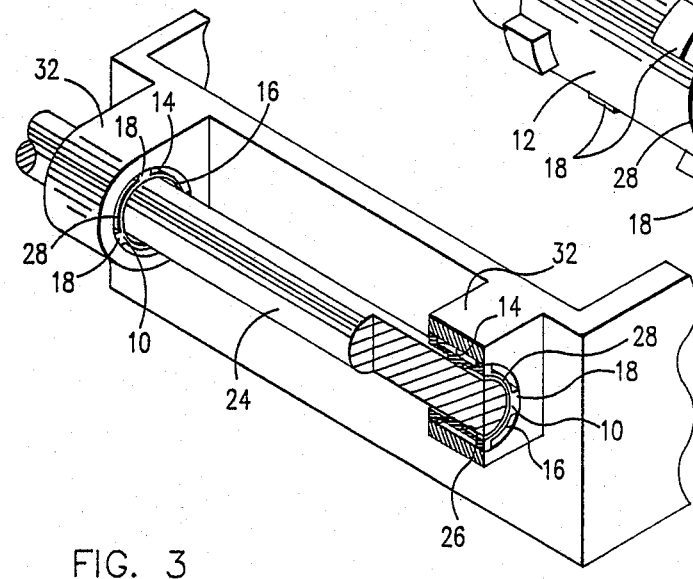
FIG. 2 is a partial sectional view of two of the bearings in bores of a supporting part and with the associated shaft inserted in the bearings.
Figure 3:
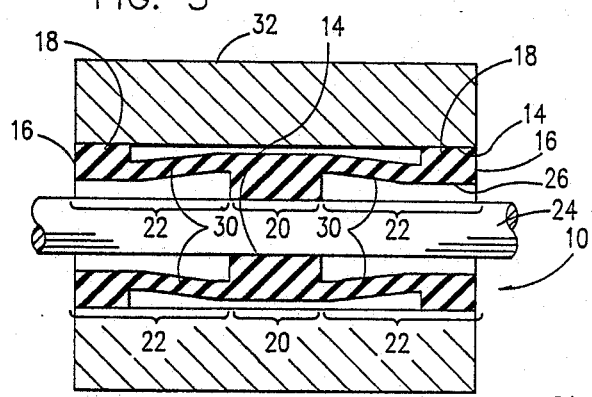
FIG. 3 is a frontal sectional view of the bearing, shaft and bore.

Referring to FIGS. 1-3, where like numbers denote like portions, the bearing 10 is illustrated in its unstressed condition, in which it is a cylinder 12 of substantially uniform outside diameter. The diameter is sized to be a loose fit with the interior of the bore 14 into which it is intended to be inserted.

Arranged about the circumference of the cylinder 12 and at the cylinder ends 16 are a plurality of projections 18 which may be described as segments 18 of an interrupted flange. These protrusions or flange segments 18 engage the interior of the bore 14 and are dimensioned such that the diametral dimension of the flange segments 18 is larger than the diameter of the bore 14, by an amount that will result in the deflection of the cylinder 12 at the ends and thus create the outward restore force which then acts to hold the cylinder 12 in the bore 14. In the center, axially of the cylinder 12, is a continuous projecting cylinder 20 dimensioned to engage shaft 24.

The interior of the cylinder 12 is, in effect, three subcylinders, positioned end to end, best seen in FIG. 3. One subcylinder is the bearing cylinder 20, the other two being the larger interior diameter of the end or positioning cylinders 22. The bearing cylinder 20 accepts the shaft 24 of the device being supported either rotationally or axially. The positioning cylinders 22 have an inside diameter 26 which is sufficiently larger that the diameter of the shaft 24 that the portion underlying the segments 18 of the flange will not contact the shaft 24 when the bearing 10 is in place within the bore 14.

The flange segments 18, when forced inwardly toward the axis of the bearing 10, will tend to cause the positioning cylinders 22 to partially colapse or distort and at the same time cause the segments 28 of the cylinder 12 intermediate the flange segments 18 to tend to bow outward. The natural tendency of the cylindrical structure is to return to an undeformed state. This tendency causes the flange segments 18 to be forced outwardly toward the surface of bore 14 and engage the bore 14 with sufficient force to retain the bearing 10 in the bore 14.

The deflection of the cylinder 12 at and between the flange segments 18 will have no undesirable effect on the cylindrical shape of the bearing cylinder 20, since the flexing occurs in the thinner cylinder walls 30 (FIG. 3) between the end of the cylinder 12 and the bearing cylinder 20.

The suspension of the bearing cylinder 20 by and between the positioning regions 22 of the bearing 10 allows some limited additional flexing of the cylinder walls 30, thereby resulting in a self-aligning bearing 10 with a limited degree of alignment capability.

The bearing 10 is molded of the desired plastic material and the bearing 10 is then inserted into the bore 14 of the part 32 in which the bearing 10 will reside. During insertion, the flange segments 18 will be forced inwardly sufficiently to permit entry into the bore 14 and in so doing the cylinder of the positioning region 22 will be deformed. The deformation of the cylinder 12 will act to create the outward restorative force that, when exerted against the bore 14, will be sufficient to hold the bearing 10 in bore 14 during normal use. Substantial deflection or distortion of the cylinder is necessary due to the relatively low forces generated by the plastic in its effort to restore to the non-distorted shape.

The molded bearing surface of the bearing cylinder 20 is left undisturbed by post assembly finishing operations and the dimensional control is enhanced since it may be best and more consistently controlled in the molding operation.

Figure 4:
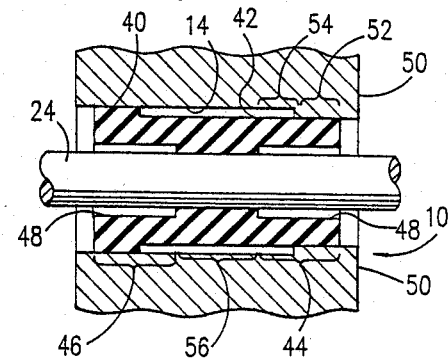
FIG. 4 illustrates an alternative embodiment of the bearing having positioning regions which have a continuous flange and/or absence of a flange.

An alternative embodiment of the bearing 10 is illustrated in FIG. 4. Referring to FIG. 4, the external flange 40 is continuous on the one end of the bearing 10 and a smaller, smooth cylindrical shape 42 extends around the entire end of a smooth cylindrical positioning region 44. This structure functions in a similar manner to the bearing of FIGS. 1-3. The reduction in the diameter of the interior of cylindrical shape 42 and flange 40 at positioning regions 44 and 46 is accommodated by the interior daimeter of cylindrical shape 42 and flange 40 being larger than the diameter of the shaft 24 intended for the bearing 10.

Where the positioning region 44 is of the smooth cylinder configuration, the bore 14 of the accepting machine part 50 should be formed to concentrate the engaging force on the positioning region 44 in a limited band 52 around the circumference of the positioning region 44, while leaving a portion 54 of the positioning region 44 unconstrained in a radial direction, to eliminate the stresses of positioning region 44 being transferred to the bearing region 56. Bearing region 56 is functionally equivalent of cylinder 20 of the first embodiment.

The embodiment disclosed in FIG. 4 is useful when the interior bore 14 is not symmetrical. This invention could easily be modified to other forms such as having a continuous flange around both ends of the bearing 10.

With multiple embodiments disclosed, it is clear that other changes may be made to the structures disclosed herein by one of skilled in the art.

I claim:

1. A bearing for insertion into a bore to support a shaft comprising:
    a cylindrical having ends and an interior diameter defining a first cylindrical surface and an outside diameter;
    a bearing surface for said shaft comprising a second cylindrical interior surface, said second surface having a length substantially less than the length of said cylinder and a diameter of less than said interior diameter of said cylinder, said bearing surface supported within said first cylinder and positioned intermediate and spaced from said ends of said cylinder;
    a plurality of frictional engaging protrusions distributed about the exterior surface of said cylinder and proximate said ends of said cylinder, said protrusions having a dimension in the radial direction less than one-half the difference between the diameter of said second cylindrical interior surface and the diameter of said first cylindrical surface and a length of less than the distance from said end of said cylinder to said second cylindrical interior surface;
    said protrusions being deflectable inwardly when inserted into said bore to thereby create retaining force against said bore with said cylindrical interior surface being unaffected by said deflections.

2. The bearing of claim 1 wherein said bearing is a molded structure.

3. The bearing of claim 1 wherein said protrusions are equally spaced about the circumference of said cylinder proximate at least one of said ends of said cylinder.

4. The bearing of claim 3 wherein said protrusions are equally spaced about the circumference of both said ends of said cylinder.

5. The bearing of claim 1 wherein said outside diameter of said cylinder is less than the daimeter of the bore into which said bearing is to be inserted.

* * * * *